(12) United States Patent
Danner

(10) Patent No.: US 12,024,603 B2
(45) Date of Patent: Jul. 2, 2024

(54) METHOD AND SYSTEM FOR FORMING A COMPOSITE MATERIAL

(71) Applicant: 10942731 CANADA CORPORATION, Winnipeg (CA)

(72) Inventor: Kevin Danner, Winnipeg (CA)

(73) Assignee: 10942731 CANADA CORPORATION, Winnipeg (CA)

( * ) Notice: Subject to any disclaimer, the term of this patent is extended or adjusted under 35 U.S.C. 154(b) by 658 days.

(21) Appl. No.: 17/271,346

(22) PCT Filed: Sep. 7, 2018

(86) PCT No.: PCT/CA2018/051093
§ 371 (c)(1),
(2) Date: Feb. 25, 2021

(87) PCT Pub. No.: WO2020/047645
PCT Pub. Date: Mar. 12, 2020

(65) Prior Publication Data
US 2021/0324152 A1    Oct. 21, 2021

(51) Int. Cl.
*C08J 5/04* (2006.01)
*B01F 23/60* (2022.01)
(Continued)

(52) U.S. Cl.
CPC ............ *C08J 5/043* (2013.01); *B01F 23/60* (2022.01); *B01F 27/0531* (2022.01);
(Continued)

(58) Field of Classification Search
CPC ..................... B29B 7/82; B29B 7/92
See application file for complete search history.

(56) References Cited

U.S. PATENT DOCUMENTS 7,311,050 B2   12/2007   Eastin et al.

FOREIGN PATENT DOCUMENTS

CN       103521156        1/2014
DE    102005052770 A1 *   5/2007    .......... B01F 13/1027
(Continued)

OTHER PUBLICATIONS

Zanoaga et al., Cellulose Chemistry and Technology 50 (5-6), 637-648 (2016).*

(Continued)

*Primary Examiner* — Vu A Nguyen
(74) *Attorney, Agent, or Firm* — Ryan W. Dupuis; Kyle R. Satterthwaite; Ade & Company Inc.

(57) ABSTRACT

A method of forming a composite material includes mixing granules of thermoplastic(s) and granules of reinforcing material(s) using a mixer with an interior friction coating. The friction generated by interaction between the granules and friction coating causes granules of at least one of the thermoplastic(s) to be heated to a liquid or semi-liquid state. The liquid/semi-liquid thermoplastic(s) act a binder for the mixed material. A system for forming such a composite material includes such a mixer with an interior friction coating. The system may also include a mould and/or a press for forming material produced by the mixer into a finished shape. The method and system may use post-consumer and post-industrial material as an input allowing such material to be recycled. In some cases, cross-contaminated or mixed post-consumer/post-industrial material may be recycled, potentially reducing environmental impacts.

16 Claims, 8 Drawing Sheets

(51) Int. Cl.
| | |
|---|---|
| B01F 27/053 | (2022.01) |
| B01F 27/1125 | (2022.01) |
| B01F 27/191 | (2022.01) |
| B01F 27/906 | (2022.01) |
| B01F 35/21 | (2022.01) |
| B01F 35/512 | (2022.01) |
| B01F 35/71 | (2022.01) |
| B01F 35/90 | (2022.01) |
| B29B 7/00 | (2006.01) |
| B29B 7/16 | (2006.01) |
| B29B 7/28 | (2006.01) |
| B29B 7/82 | (2006.01) |
| B29B 7/92 | (2006.01) |
| B29K 101/12 | (2006.01) |
| B29K 311/14 | (2006.01) |
| C08J 3/12 | (2006.01) |
| C08J 3/20 | (2006.01) |
| C08J 5/06 | (2006.01) |
| B01F 101/00 | (2022.01) |
| B29C 70/00 | (2006.01) |

(52) U.S. Cl.
CPC ........ *B01F 27/1125* (2022.01); *B01F 27/191* (2022.01); *B01F 27/906* (2022.01); *B01F 35/2115* (2022.01); *B01F 35/512* (2022.01); *B01F 35/71775* (2022.01); *B01F 35/90* (2022.01); *B29B 7/005* (2013.01); *B29B 7/16* (2013.01); *B29B 7/283* (2013.01); *B29B 7/286* (2013.01); *B29B 7/82* (2013.01); *B29B 7/92* (2013.01); *C08J 3/12* (2013.01); *C08J 3/203* (2013.01); *C08J 5/045* (2013.01); *C08J 5/06* (2013.01); *B01F 2035/99* (2022.01); *B01F 2101/2805* (2022.01); *B29C 70/00* (2013.01); *B29K 2101/12* (2013.01); *B29K 2311/14* (2013.01); *C08J 2323/06* (2013.01); *C08J 2323/12* (2013.01); *C08J 2325/06* (2013.01); *C08J 2327/06* (2013.01); *C08J 2355/02* (2013.01); *C08J 2367/02* (2013.01); *C08J 2367/04* (2013.01); *C08J 2369/00* (2013.01); *C08J 2377/06* (2013.01)

(56) References Cited

FOREIGN PATENT DOCUMENTS

| | | |
|---|---|---|
| DE | 202010004632 | 11/2010 |
| EP | 2933289 | 10/2015 |

OTHER PUBLICATIONS

Machine translation of DE 102005052770 A1 (Year: 2005).*
Torsten Kies, "Development and application of a technical comparison method for estimation the processing properties of thermoplastic recyclates in injection molding", Dec. 9, 2002, Dissertation for obtaining the academic degree approved by the Faculty of Mathematics, Natural Sciences and Technology, Department of Engineering Sciences as the Martin Luther University in Halle-Wittenberg (http://nbn-resolving.de/um/resolver.pl?um=nbn%3Ade%3Agbv%3A3-000004552).

* cited by examiner

| | Plastic | Melt Temperature Range |
|---|---|---|
|  | Low-density polyethylene (LDPE / PE-LD) | 220-250 F 105-120 C |
| | Acrylonitrile butadiene styrene (ABS) | 221F 105 C |
|  | High-density polyethylene (HDPE / PE-HD) | 250-350 F 120-180 C |
|  | Polyvinyl chloride (PVC / V) | 212-500 F 100-260 C |
|  | Polypropylene (PP) | 338 F 170 C |
|  | Polystyrene (PS) | 464 F 240 C |
| | Polyester | 482 F 295 C |
| | Nylon | 500-525 F 260-275 C |
|  | Polyethylene terephthalate (PETE / PET) | 490-510 F 250-260 C |

600

METHOD AND SYSTEM FOR FORMING A COMPOSITE MATERIAL

FIELD

This relates to composite materials and, more particularly, to a method and system for forming a composite material from thermoplastics and other materials. In some embodiments, the thermoplastics and/or the other materials may be waste material such as, for example, post-consumer and/or post-industrial waste materials.

BACKGROUND

Waste material is typically disposed in landfills or by other disposal methods such as, for example, incineration. In order to mitigate the environmental impacts of disposal, some materials are recycled into new products. For example, post-consumer paper may be recycled into new paper products such as, for example, paper towels. In another example, post-consumer aluminum such as, for example, cans, can be used as an input to production of new aluminum products.

However, not all materials can be so easily recycled or even recycled at all.

In one example, many processes consuming recycled material rely on that material being sorted to include only material of particular type. However, recycling programs often rely on consumers to sort waste materials, and such sorting is often inaccurate. For example, loads of plastics may include a mix of many different types of plastic. In some cases, such mixing may be intentional such as, for example, due to collection practices and/or, potentially, due to a desire to limit the complexity of a recycling program. In other cases, such mixing may arise unintentionally such as, for example, due to inaccurate sorting resulting in cross-contamination. In any event, mixed loads of materials such as plastic can be impossible to recycle without further sortation. Such sortation may, however, be extremely difficult or cost-intensive and may require large amounts of manual labour making it impractical or cost-prohibitive.

Mixed material products can prove especially difficult to recycle. For example, if an item is formed of types of plastic or plastics mixed with other materials, then plastics recycling efforts may be frustrated.

In another example, some materials are not recyclable at all. In one particular example, waste fiberglass such as, for example, used insulation is not recyclable in conventional recycling programs or processes.

BRIEF DESCRIPTION OF THE DRAWINGS

Embodiments are described in detail below, with reference to the following drawings.

Like reference numerals are used in the drawings to denote like elements and features.

DETAILED DESCRIPTION

Figure 1:
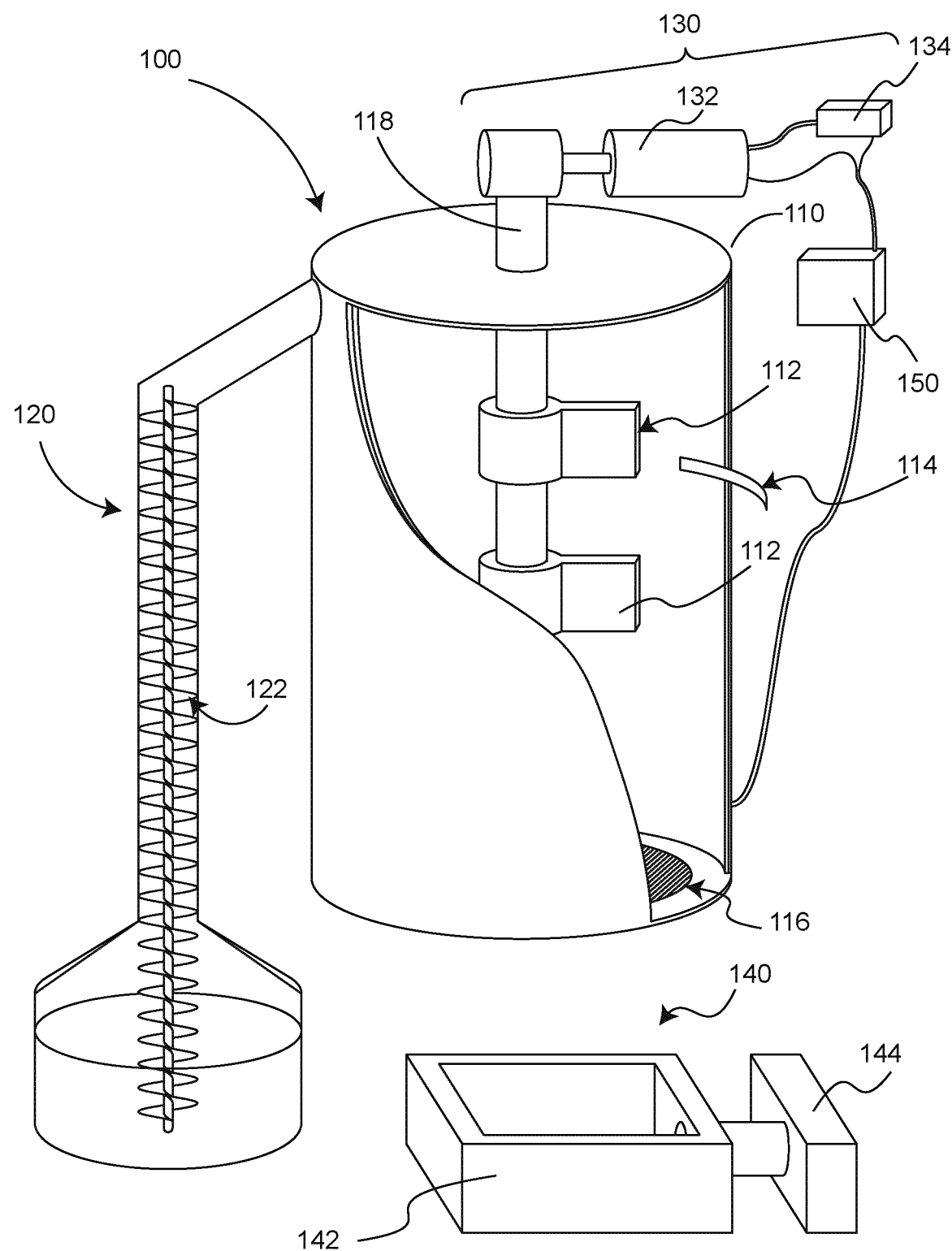
FIG. 1 is a schematic drawing illustrating components of an example system for forming a composite material.

According to the subject matter of the present application, there may be provided a method of forming a composite material. The method may include mixing material using a mixer having interior surfaces coated with a friction coating. The material being mixed may include granules of one or more thermoplastics and granules of one or more reinforcing materials. It may be that the friction generated by interaction between the granules and friction coating causes granules of at least one of the one or more thermoplastics to be heated to a liquid or semi-liquid state. The liquid or semi-liquid thermoplastic may a binder for the mixed material.

The method may further include forming the mixed material into a shape. The method may yet further include further forming the shape into a finished shape.

It may be that, before forming the mixed material into the shape, the mixed material is allowed to cool and is then heated at least until the mixed material becomes malleable.

It may be that at least one of the one or more thermoplastics and the one or more reinforcing materials is a post-consumer or a post-industrial waste material.

The friction coating may be a tungsten carbide grit. The tungsten carbide grit may consist of particles of sizes corresponding to an ISO 6344 grit between P20 and P50.

It may be that the one or more thermoplastics include polyethylene terephthalate, polyethylene, polyvinyl chloride, polycarbonate, polypropylene, nylon, polystyrene, polyester, acrylonitrile butadiene styrene, and/or polylactic acid.

The method may further include granulating the one or more thermoplastics to form the granules of one or more thermoplastics. It may be that, prior to granulating the one or more thermoplastics, the one or more thermoplastics are washed and dried.

It may be that the one or more reinforcing materials include wood, wood products, textiles, agricultural fibres, plant fibres, organic fibres, carpet, upholstery, spun fibre, and/or thermoset material.

The method may further include granulating the one or more reinforcing materials to form the granules of one or more reinforcing materials.

It may be that the one or more reinforcing materials include wood and, prior to granulation, the wood is chipped into pieces.

The method may further include detecting that the granules of the at least one of the one or more thermoplastics have been heated to the liquid or semi-liquid state based on a measured temperature inside the mixer.

The mixed material may be formed into a shape using a press.

The method may further include adding at least one of additional granules of one or more thermoplastics and additional granules of one or more reinforcing materials to the mixer and further mixing the mixed material and the additional granules.

According to the subject matter of the present application, there may be provided a composite material formed of one or more thermoplastics and one or more reinforcing materials according to the above-described method.

According to the subject matter of the present application, there may be provided a system for forming a composite material. The system may include a mixer and a drive system. The mixer may be operable to mix granules of one or more thermoplastics and granules of one or more reinforcing materials. The mixer may have interior surfaces coated with a friction coating. The drive system may be in driving engagement with the mixer.

It may be that friction coating is a tungsten carbide grit. It may be that the tungsten carbide grit consists of particles of sizes corresponding to an ISO 6344 grit between P20 and P50.

The system may further include at least one temperature sensor positioned within the mixer.

The system may further include a material former for forming the mixed material into a shape. The material former may include a press. The press may be a hydraulic press. Additionally or alternatively, the material former may include a mould. Additionally or alternatively, the material former may include an extruder.

The mixer may include a gate operable to direct material mixed by the mixer into the material former. The system may further include a control system operable to open the gate based on a detected condition. The detected condition may be based on at least one of a temperature inside the mixer and a measure of resources being consumed to drive the mixer.

The system may further include at least one auger for conveying one or more of granules of one or more thermoplastics and granules of one or more reinforcing materials into the mixer.

According to the subject matter of the present application, there may be provided a system including a mixer and motive means. The mixer may be for mixing thermoplastic and reinforcing material granules. The mixer may have interior surfaces coated with a friction coating. The motive means may be for driving the mixer.

The system may further include means for granulating one or more thermoplastics to form thermoplastic granules and/or means for granulating one or more reinforcing materials to form reinforcing material granules.

The friction coating may be a tungsten carbide grit. The tungsten carbide grit may consist of particles of sizes corresponding to an ISO 6344 grit between P20 and P50.

The system may further include means for sensing a temperature of material inside the mixer.

The system may further include means for conveying the granulated thermoplastic and reinforcing material granules into the mixer.

Other aspects and features of the present application will be understood by those of ordinary skill in the art from a review of the following description of examples in conjunction with the accompanying figures.

Figure 2:
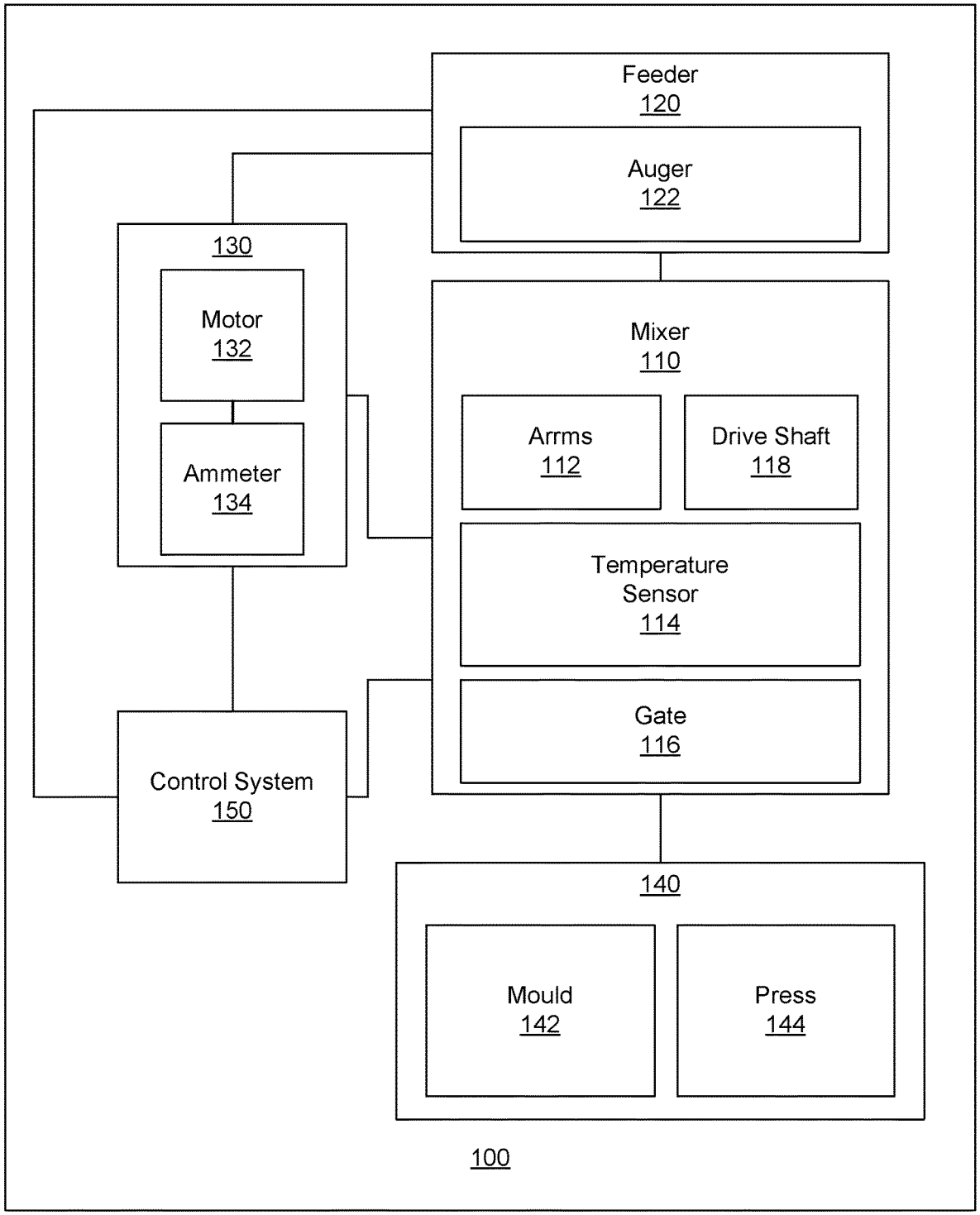
FIG. 2 is a simplified block diagram illustrating relationships between the components of the example system of FIG. 1.

FIG. 1 is a schematic drawing illustrating components of an example system 100 for forming a composite material. FIG. 2 is simplified block diagram illustrating relationships between the components of the example system 100. FIG. 1 and FIG. 2 may be referred to in tandem.

As further described below, the example system 100 is operable to mix granules of one or more thermoplastics and granules of one or more reinforcing materials to form mixed material that is then formed into a finished shape. Examples of possible thermoplastics and reinforcing materials are further described below.

As illustrated, the example system 100 includes a mixer 110, a feeder 120, a mixer drive system 130, a control system 150, and a material former 140.

The feeder 120 transfers granules of the one or more thermoplastics and the granules of the one or more reinforcing materials into the mixer 110. Various means may be employed for feeding the granules into the mixer 110. For example, as illustrated, an auger 122 may be employed for feeding the granules. The auger 122 may convey the one or more granules of the one or more thermoplastics and/or the granules of the one or more reinforcing materials into the mixer 110.

As further described below, the granules of the one or more thermoplastics are formed of plastics or polymers that become pliable, melted, and/or achieve a liquid or semi-liquid state when sufficiently heated and that will return to a non-pliable or semi-pliable, solid state after subsequent cooling. For example, the granules of the one or more thermoplastics may be granules of a variety of thermoplastic polymer materials such as, for example, polyethylene terephthalate (PETE/PET), high-density polyethylene (HDPE/PE-HD), polyvinyl chloride (PVC), polycarbonate (PC), low-density polyethylene (LDPE/PE-LD), polypropylene (PP), nylon, polystyrene (PS), polyester, acrylonitrile butadiene styrene (ABS), polylactic acid (PLA) and/or combinations thereof.

As further described below, the granules of the one or more reinforcing materials may be granules of a variety of materials such as, for example, wood and/or wood products; textiles; agricultural, plant or organic fibres (e.g., roots, stems, leaves, flowers, fruits, seeds, husks, shells, straw, chaff, etc.); carpet; upholstery; spun fibres such as, for example, fibreglass, mineral fibres, carbon fibres, etc.; thermoset material and/or combinations thereof.

Notably, some materials, when granulated, may provide granules of both reinforcing material and thermoplastic, either separately or in combination or both. For example, a carpet with a burlap backing and polyester pile may provide both reinforcing material (from the backing) and a thermoplastic (from the pile). In another example, a particular reinforcing material (e.g. a paper product) may have a thermoplastic film coating. In yet another example, it may be that spent articles formed according to the subject-matter of the present application are granulated (providing, therefore, both thermoplastic and reinforcing material) and reprocessed according to the subject-matter of the present application to form new articles.

The various reinforcing material(s) and thermoplastic(s) employed may be post consumer waste material. As further described below, in some cases, one or more of the reinforcing material(s) and/or one or more of the thermoplastic(s) may include some degree of contamination. For example, where a material is a post consumer waste material it may be contaminated due to, for example, soiling, food waste, etc.

In some embodiments, the different sorts of granules may be combined before feeding and fed by a single auger such as, for example, the auger 122. In another example, more than one auger may be employed. Other feed mechanisms may be employed. For example, one or more hoppers may be employed to provide material to an auger and/or in combination with a gate in a gravity feed arrangement.

Whether combined before feeding or in the mixer, the different sorts of granules may be combined in a variety of ratios. As further described below, some or all of the thermoplastic granules will be heated to a liquid or semi-liquid state so as to act as binder for the reinforcing material(s) and, potentially, for others of the thermoplastic materials. Accordingly, the ratio of thermoplastic granules to reinforcing material granules and, more particularly, of the thermoplastic granules of the one or more of the thermoplastics (if more than one is employed) that will be employed as a binder to the other materials added to the mixer, may vary. In particular, the ratio may be varied so as to balance a degree of binding against other considerations such as, for example, other properties of the resultant material. The applicant has found that including anywhere from 5% to 95% thermoplastic in the material can be effective in producing composite material suitable for particular applications.

Feeding of material by the feeder 120 into the mixer 110 may be controlled by the control system 150.

As illustrated, the mixer 110 has at least some of its interior surfaces coated with a friction material. The mixer 110 may includes one or more arms 112. The arms 112 may, as illustrated, each mounted on a drive shaft 118. As further described below, the drive shaft 118 may be driven by motive force provided by the mixer drive system 130. This, in turn, may cause the drive shaft 118 and the arms 112 to rotate. The rotary action of the arms 112 causes the granules to be mixed thoroughly and at high-speed. Such mixing may also cause the material in the mixer 110 to come into contact with the friction material. For example, where all or a portion of some or all of the arms 112 are coated with the friction material, the material being mixed may come into contact with the friction material as it flows along coated portions of such arms. Additionally or alternatively, where the interior walls of the mixer 110 are coated with friction material, the material being mixed may come into contact with friction material as it flows along the interior walls of the mixer 110. Notably, if both the arms 112 and the interior surfaces of the mixer 110 are coated with friction material, then the material being mixed will come into contact with the friction material as it flows between them. In any event, as material being mixed comes into contact with friction coating during mixing, the material being mixed will be heated via friction action. Additionally, the friction coating may act to abrade material being mixed.

As the material being mixed is heated, granules of one or more of the thermoplastics may be heated to a liquid or semi-liquid state. As further described below, the at least one liquid or semi-liquid thermoplastic will act as a binder for a composite material formed of the mixed granules. Additionally, the reinforcing materials may act to provide shear, compressive, and/or flexural strength in the composite material. The mixer 110 also serves to mix the liquid or semi-liquid thermoplastic binder with the other granules being blended. Conveniently, such mixing/heating may cause at least a partial thermal decomposition of one or more of the constituent materials and then, with the aid of the binder, and the further processing provided by the example system 100, the materials may be reintegrated.

Additionally or alternatively, such heating may act to dry the various granules. For example, where wood or wood products are employed as a reinforcing material, they may include some moisture. Accordingly, such heating may extract water vapour from the fed-in materials. Put differently, the friction generated by interaction between the granules and the friction coating may cause moisture to be extracted from the mixed material. Conveniently, such drying may act to enhance the binding in the composite material. In particular, excess moisture may prevent or inhibit the binder (i.e. the liquid or semi-liquid thermoplastic) from binding the various materials together.

Additionally or alternatively, the mixing may extract oxygen from the fed-in materials such as, for example, via vortex action. For example, according to such vortex action, extracted oxygen may form a vortex about any axis or axes on which the arms 112 may be mounted. The mixer 110 may include one or more suitably positioned holes or vents to allow such oxygen and/or other gases, vapours, released by the processing, if any such as, for example, the aforementioned water vapour) to be released from the interior of the mixer 110. For example, in some embodiments, where the drive shaft 118 extends through holes in end plates of the mixer 110 as suggested above, those holes may be sized larger than the drive shaft 118 to provide for venting. In a particular example, the holes through which the drive shaft 118 extends may be at least 10% larger than the cross-sectional diameter of the drive shaft 118 where it passes through a given end plate. Additionally or alternatively the mixer 110 may include one or more vents in the sides thereof traversing between the interior and exterior walls of the mixer. In some embodiments, the mixer 110 may include a dust collection system (not shown) such as, for example, in communication with such vents.

As explained above, the friction coating acts to provide friction in order to abrade and/or heat material being mixed in the mixer. The Applicant has found a friction coating formed of particles between 20 and 50 grit to be effective for providing the requisite heating.

In some embodiments, the friction coating may be a metallic friction coating. In a particular example, the friction coating may be formed of a tungsten carbide grit. For example, a tungsten carbide grit consisting of particles between 20 and 50 grit may be employed. Conveniently, a tungsten carbide friction coating may be sufficiently durable as to allow for many repeated uses of the mixer 110 without the need to apply the friction coating due to wear and/or damage. Put differently, the friction coating may be a tungsten carbide grit and may include or consist of particles of sizes corresponding to an ISO 6344 grit between P20 and P50. As noted above, the friction coating is applied to the interior surfaces of the mixer 110. For example, the friction coating may be applied to interior walls of the mixer 110. In another example, the friction coating may, additionally or alternatively, be applied to all or a portion of the arms 112. Conveniently, so applying a friction coating may limit or prevent damage to the arms 112 through heating during mixing. Additionally or alternatively, the drive shaft 118 on which the arms 112 are mounted may or may not be coated with the friction coating. The friction coating will have a particular thickness. For example, the applicant has found that where a tungsten carbide grit of 20 to 50 grit is employed, a ⅝" coating has desirable properties in relation to wear and protecting the mixer and arms from damage.

In another example, the friction coating may, additionally or alternatively, include a ceramic material and/or a metallic or metal alloy material other than tungsten carbide.

As noted above, the mixer 110 is driven by motive force provided by the mixer drive system 130. The mixer drive system 130 may include a motor 132. The motor 132 is in driving engagement with the mixer 110. The motor 132 may drive the mixer 110 directly or indirectly such as, for example, by way of a transmission and/or one or more drive belts. The motor 132 may cause the arms 112 to be driven. For example, the motor 132 may, directly or indirectly, drive an axle on which the arms 112 are mounted in the mixer 110.

The motor 132 has a power rating suitable for driving the mixer at a suitable rate. For example, the motor 132 may be operable to drive the drive shaft 118 of the mixer at 1750 rotations per minute (rpm). The motor 132 may have a nominal power rating of 250 horsepower or more.

As further explained below, mixing continues until at least one of the thermoplastic materials is melted sufficiently to coat, cover, adhere to, fuse with, infuse and/or physically or chemically bind to the reinforcing material(s).

After mixing, the mixed material is transferred from the mixer 110 to the material former 140. For example, it may be that the mixer 110 includes a gate 116 that is opened to cause mixed material to exit the mixer due to gravity. In other words, the gate 116 may, when opened, allow the mixed material by being dumped from the mixer 110. In addition to gravity or such as, for example where the gate 116 is disposed along a side of the mixer 110, as an alternative to gravity, the mixer drive system 130 may drive the mixer 110 after opening of the gate 116 so as to cause or urge ejection of mixed material from the mixer 110 such as, for example, by way of centrifugal force. The removal of the mixed material from the mixer 110 may be controlled by the control system 150 based on a detected condition. For example, the control system 150 may be operable to open the gate 116 when the mixing of the granules reaches such a desired state such as, for example, when a thermoplastic reaches a liquid or semi-liquid state as discussed above (e.g., when it is in which it is sufficiently melted as discussed above) or, more broadly, based on some detected condition related to such a desired state. For example, as further described below, the detected condition may be based on a temperature inside the mixer and/or a measure of resources being consumed to drive the mixer such as, for example, the current draw of the motor 132 where the motor 132 is an electric motor.

Additionally or alternatively, the mixer drive system 130 may cease driving the mixer 110 based on the detected condition. This may, for example, be triggered by the control system 150. In one example, the mixer drive system 130 may cease driving the mixer 110 prior to opening the gate 116. Where the control system 150 is responsible for control of the mixer drive system 130 and the gate 116 it may coordinate the ordering of termination of the driving of the mixer 110 and the opening of the gate 116. In one example, the control system 150 may cause the mixer drive system 130 to cease driving the mixer 110 and may wait for the mixer 110 to stop driving (such as may, for example, be determined using a sensor coupled to the control system 150 such as, for example, an ammeter 134) before opening the gate 116. In another example, the mixer 110 may be controlled to reach a lower speed (such as may again, for example, be determined by the control system 150 using a sensor such as, for example, the ammeter 134) before opening the gate 116. Additionally or alternatively, the control system 150 may control the mixer drive system 130 to cause the mixer 110 to be driven after the gate 116 is opened such as, for example, to assist in the ejection of mixed material as described above. In a particular example, it may be that the mixer 110 is driven for a defined period after the gate 116 is opened. In yet another example, the control system 150 may only control the mixer 110 to stop driving and may wait for another system (or a human operator) to open the gate 116. In some such embodiments, it may be that the control system 150 provides a suitable alert to another system or to an operator.

Upon exiting the mixer 110, the mixed material may be formed, shaped, moulded or press under high-pressure into a desired shape or size. To this end, the material removed from the mixer 110 may be received in the material former 140. Material so transferred may be formed by the material former 140 into a finished product. In particular, the transferred material may be formed into a finished product before the mixed material cools. The finished product is a composite material composed of the various granules. The finished product may take a variety of forms. For example, the finished product could be a structural member such as, for example, as may be used in place of framing lumber. In another example, the finished product may be a part of a shipping pallet (e.g. a stringer or block pallet) such as, for example, a pallet board, a pallet stringer, and/or a pallet block. A pallet including components formed of such a composite material may be more durable and/or may have greater strength than a conventional wooden pallet. Conveniently, a more durable and/or stronger pallet may require fewer repairs. Additionally, or alternatively, it may be that such a pallet has a competitive cost. It may, for example, be that the cost is comparable to traditional wooden pallets.

As further examples, the finished product may take other shapes such as, for example, building blocks, bricks, paving stones, parking curbs, deck blocks, foundations, footings, or the like. Additionally or alternatively, the finished product may be shaped as a landscape tie, a railway tie, a fence post, a deck board, a dock, a pier, a crib, etc. In some cases, it may be that the finished product has a form that, coincidentally or intentionally, corresponds to the form of one or more inputs. For example, wood used as a reinforcing material may be obtained from used pallets while the finished product corresponds to one or more components of a shipping pallet. Conveniently, in this way, wooden shipping pallets may be reprocessed to form new composite material shipping pallets.

Mixed material may be formed by the material former 140 into a finished shape before cooling in a variety of manners.

For example, the material former 140 may include a mould 142 for moulding the mixed material into a desired shape. In another example, the material former may include a press 144 for compressing the mixed material. The press may be a hydraulic press. The press 144 may compress the mixed material so as to bind the mixed material together and, in particular, the liquid or semi-liquid thermoplastic or thermoplastics can effectively serve in their role as a binder for the composite material. For example, the press may densify the mixed material under high pressures. In a particular example, pressures of 800-2200 pounds-per-square-inch (PSI) may be used in densifying the mixed material. Conveniently, in this way, composite material that is highly integrated and/or structurally solid may be prepared. In some embodiments, pressure may be applied to the mixed material in more than one direction. For example, it may be that pressure is applied to opposed sides of the mixed material. Conveniently, in this way, a more uniform density of the resultant compressed material may be provided.

The resultant shapes may be blocks. In some embodiments, the blocks may be of varying sizes.

In another example, the mixed material may, additionally, be formed by way of extrusion. For example, the gate 116 may co-operate with a die of an extruder such as (not shown) such as may be included in the material former 140 and/or the mixer 110. The die may act to shape the mixed material into a form having a desired cross-section.

As noted above, the transfer of material from the feeder 120 into the mixer 110 and/or the transfer of mixed material from the mixer 110 into the material former 140 and/or the operation of the mixer 110 and/or driving of the mixer 110 by the mixer drive system 130 may be controlled by the control system 150.

The control system 150 is a controller that actuates one or more actuators responsive to input received from one or more sensors. The control system 150 may include one or more computer hardware processors (not shown) that perform some or all of the processing necessary to actuate the one or more actuators responsive to the sensor input. For example, the control system 150 may be or include a programmable logic control (PLC) controller. In another example, the control system 150 may rely on some other form of computer control and/or other control means than computer control such as, for example, analog control electronics.

A variety of actuators may be actuated by the control system 150. For example, the actuators actuated by the control system 150 may include the auger 122 and/or the gate 116 and/or the mixer 110 and/or the mixer drive system 130.

The control system 150 may reference a variety of sensors as inputs to the control.

For example, where the motor 132 is an electric motor, the mixer drive system 130 may include the ammeter 134 for monitoring current draw by the motor 132. The ammeter 134 may be a sensor coupled to the control system 150. For example, as further described below, the current draw of the motor 132 may be used to determine when the one or more thermoplastics reach the above-mentioned liquid or semi-liquid state.

In another example, the mixer 110 may, additionally or alternatively, include a temperature sensor 114 such as, for example, a thermocouple. The temperature sensor 114 may be positioned within or adjacent to the mixer for sensing/monitoring an interior temperature of the mixer 110. The temperature sensor 114 may be a sensor coupled to the control system 150. For example, the temperature inside the mixer 110 may be used to determine when the one or more thermoplastics reach the above-mentioned liquid or semi-liquid state, either alone or in combination with one or more other sensors such as, for example, the ammeter 134.

Figure 3:
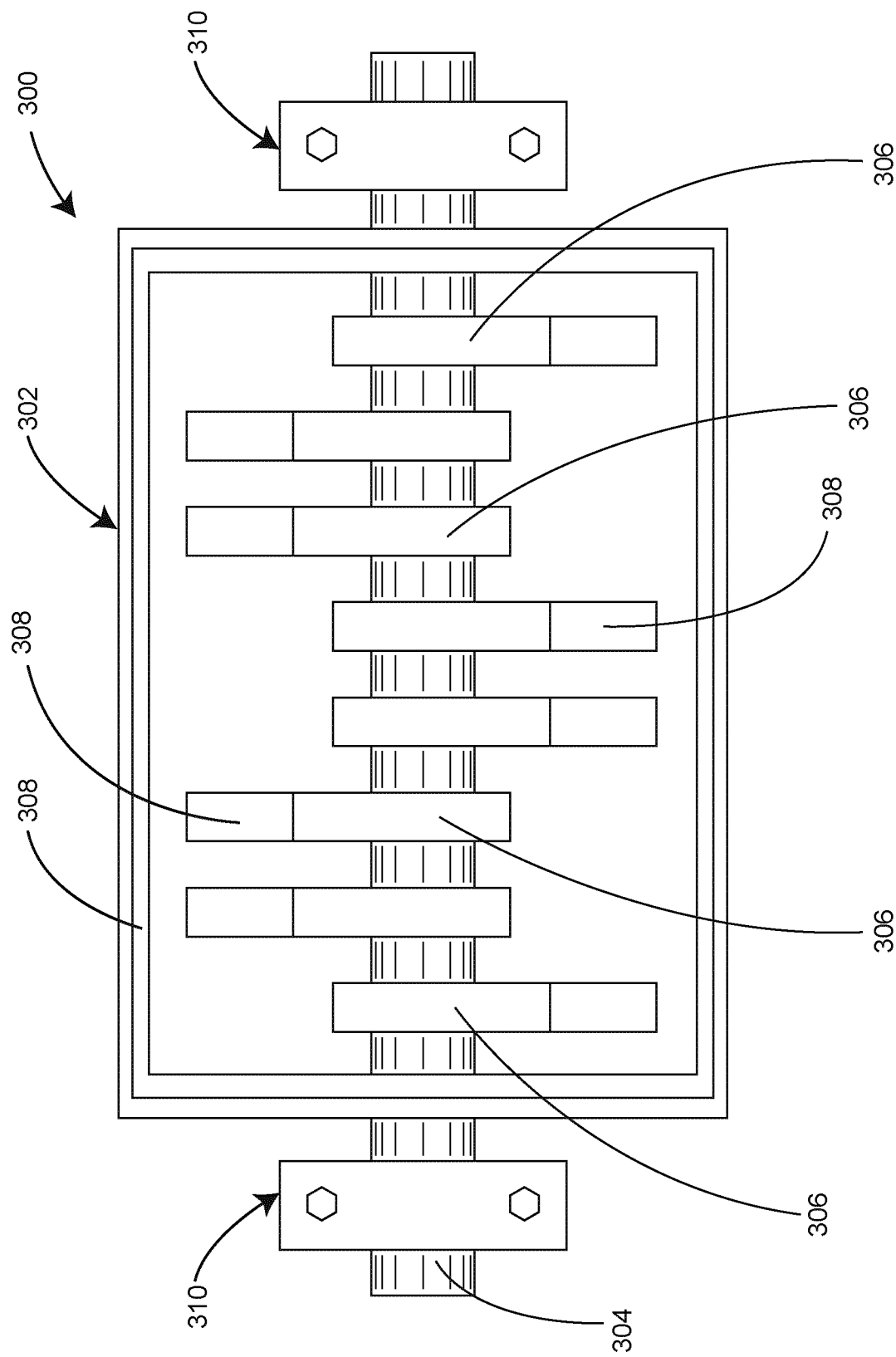
FIG. 3 is a longitudinal cross-section of an example mixer.
Figure 4:
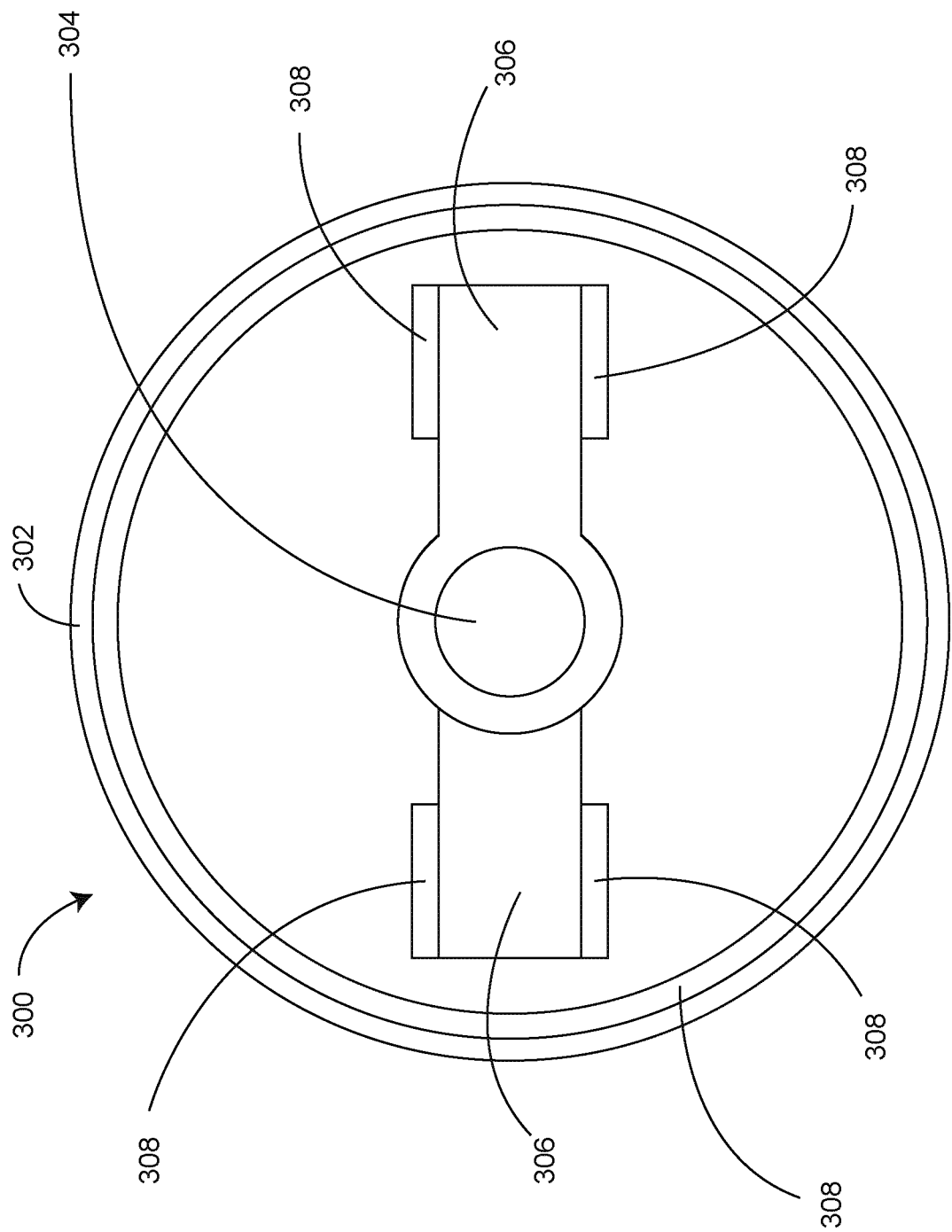
FIG. 4 is a transverse cross-section of the example mixer of FIG. 3.

In some embodiments, the mixer drive system 130 may be a component of the mixer 110. Alternatively, some of the components of the mixer drive system 130 may be components of the mixer 110. For example, it may be that the motor 132 is a component of the mixer while the ammeter 134 is not. Referring to FIGS. 3 and 4, an example mixer will now be described in greater detail. FIG. 3 shows a longitudinal cross-section of an example mixer 300. FIG. 4 shows a transverse cross-section of the example mixer 300.

The example mixer 300 includes a casing 302 defining a cylindrical shape. Passing longitudinally through the casing 302 is a shaft 304. The shaft 304 is an axle from which a series of arms 306 extend as a series of hammer-like arms. Notably, the arms 306 are not knife-edged or bladed. The interior of the example mixer 300 and a portion of each of the arms 306 are coated with a friction coating 308. The portion of each of the arms 306 that is coated with the friction coating 308 may, as shown, be along opposed portions of the arms 306 such as proximate leading edges thereof. In another example, the friction coating 308 may be positioned on a side of a given one of the arms 306 that is the leading side of according to the direction of rotation of the example mixer 300 when operated. The shaft 304 is mounted on and between a pair of bearings 310 (FIG. 3).

The casing 302 may be formed of a suitable metal such as, for example, steel. In a particular example, the casing 302 may be formed of a high-strength steel. The shaft 304 and/or the arms 306 may also be formed of such metals.

As perhaps shown best in FIG. 3, the arms 306 may extend from the shaft 304 as hammer-like arms.

The friction coating 308 is a friction coating as described above. For example, the friction coating 308 may be a tungsten carbide grit. In a particular example, the tungsten carbide grit may consist of particles of sizes corresponding to an ISO 6344 grit between P20 and P50.

The bearings 310 may be ball or roller bearings and may, in particular, be ball or roller bearings adapted to allow operation of the example mixer 300 at a suitably high rate of speed.

Figure 5:
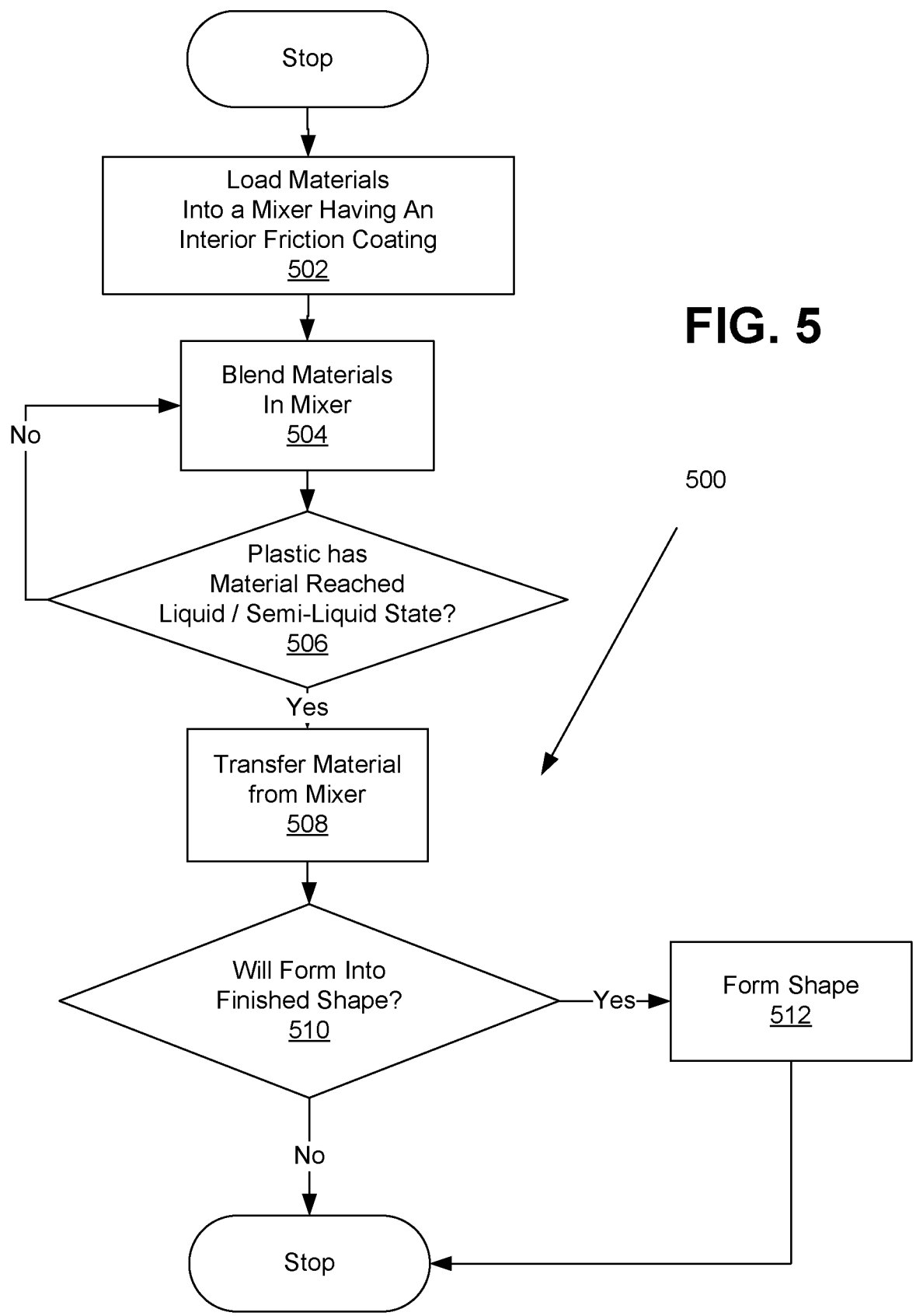
FIG. 5 is a flowchart illustrating operations in an example process for forming a composite material.

Referring to FIG. 5, a method of forming the above-described composite material will now be described in greater detail. In particular in FIG. 5, operations in a method for forming a composite material are shown in a flowchart 500.

The method begins with an operation 502. At the operation 502, materials are loaded into a mixer having an interior friction coating such as, for example, the mixer 110. In particular, granules of one or more thermoplastics and granules of one or more reinforcing materials are loaded into a mixer having interior surfaces coated with a friction coating by way of some conveyance for conveying the granulated thermoplastic and reinforcing material granules into the mixer such as, for example, the feeder 120.

Next, at an operation 504, the granules of the ones or more thermoplastics and the granules of the one or more reinforcing materials are mixed using a mixer having interior surfaces coated with a friction coating. As described above, the friction generated by interaction between the granules and the friction coating of the operating mixer causes at least some of the granules of one or more of the one or more thermoplastics to be heated to a liquid or semi-liquid state. As mentioned above, such a liquid or semi-liquid thermoplastic may act as a binder for the material in the mixer. Conveniently, such mixing may cause at least a partial thermal decomposition of one or more of the constituent materials and then, with the aid of the binder the materials may be reintegrated. The reinforcing material may provide shear, compressive, and/or flexural strength in the resulting material. Additionally, heating during mixing may allow partial pyrolysis action to occur as regards some or all of the one or more thermoplastics. For example, the applicant has found experimentally that partial pyrolysis to about 50% of full pyrolysis can allow for good fusion between the components of the composite material.

At an operation 506, it is determined whether a thermoplastic/thermoplastic(s) have reached a liquid or semi-liquid state. This may for example be determined by a control system such as, for example, the control system 150. Such a condition may be identified in a variety of manners.

In a first example, it may be determined that one or more thermoplastics have reached a liquid or semi-liquid state based on a measure of resources being consumed to drive the mixer. For example, as mentioned above, where the mixer is driven by way of an electric motor, based on a current draw of the motor during combining/mixing, it may be detected that granules of at least one of the one or more thermoplastics have been heated to a liquid or semi-liquid state.

In a first example, the relationship between current and time for an electric motor such as may drive a mixer may be considered. For example, such a relationship may be considered for current draw by motor 132 when employed as part of the mixer drive system 130 when the motor 132 is an electric motor.

During mixing, the current draw may increase and then may begin to reduce as one or more plastics approach a liquid or semi-liquid, thereby easing the burden on the motor to drive the mixer. The current draw may decline until reaching a threshold level. The threshold level may correspond to a current draw expected when one or more thermoplastics have achieved a liquid or semi-liquid state. The threshold level may be determined experimentally for a particular system for forming a composite material according to the subject matter of a present application.

Additionally or alternatively, the current draw may be monitored during mixing to ensure that an upper limit is not exceeded during mixing. The upper limit may be a safety threshold. The upper limit may correspond to a current draw above which a particular undesired condition may be possible or likely. For example, the upper limit may be selected based on preventing an overcurrent condition for the motor. In a particular example, where a given electric motor may not be able to bear a current in excess of 300 Amps, the upper limit may be selected to be at or about 300 Amps.

Figure 6:
FIG. 6 is a table showing approximate melt temperatures for various thermoplastics.
Figure 6:
Figure 6:
Figure 6:
Figure 6:
Figure 6:

The plot in FIG. 6 is by way of example only and may not correspond precisely to the draw of motors in every embodiment. For example, it may be that an electric motor has an initially in-rush current draw (not shown) that is near to or even exceeds the expected draw when the liquid or semi-liquid is achieved. Notably, a controller may be adapted to ignore or disregard such an in-rush current. For example, it may be that a control system for a mixer (such as, for example, the control system 150) is adapted to require a minimum mix time such as may serve to effectively ignore such in-rush current.

In a second example, it may be determined that one or more thermoplastics have reached a liquid or semi-liquid state based on temperature such as, for example, an interior temperature inside the mixer during mixing. For example, it may be that a particular thermoplastic or thermoplastics are, based on their physical properties, known to achieve the desired liquid or semi-liquid state at a particular temperature.

As such, the relationship between temperature and time for the interior of a mixer may be considered. Such a relationship may, for example, be considered for the interior temperature of the mixer 110 over time during mixing.

During mixing, the interior temperature in a mixer may increase until reaching a threshold level. The threshold level may correspond to a temperature at which one or more of the thermoplastics of which granules are included in the material being mixed is known or expected to reach a liquid or semi-liquid state. The threshold level may be determined experimentally and/or based on known physical properties of particular thermoplastics. Additionally or alternatively, the threshold level may be selected based upon a "melt" temperature of the thermoplastic or thermoplastics included in the granules and/or the ones of those thermoplastics that are intended to be employed as the binder.

FIG. 6 provides a table 600 showing approximate melt temperatures for various thermoplastics. For convenience of reference, some of the thermoplastics are labelled with associated ASTM International Resin Identification Coding System (RIC) codes. A melt temperature may be employed in selecting the threshold level. For example, the threshold level may be set to a value of or about a relevant one of the melt temperatures provided in the table 600. For example, the threshold level may be selected based on a particular one of the thermoplastics that is known be predominate in the thermoplastic granules being employed. Additionally or alternatively, the threshold level may be selected to focus on achieving a liquid or semi-liquid thermoplastic of a particular type. For example, the applicant has found that material with favourable properties for certain purposes may be obtained when liquid or semi-liquid polyethylene is employed as a binder. Notably, where a threshold level is selected that is less than or below the melt temperature/melt temperature range of another thermoplastic that features in the various granules, the granules of that thermoplastic may serve as further reinforcing material in the mixed material, rather than as a binder.

Additionally or alternatively, interior temperature may be monitored during mixing to ensure that an upper limit is not exceeded during mixing. The upper limit may be a safety threshold. The upper limit may correspond to a temperature above which a particular undesired condition may be possible or likely. For example, the upper limit may be selected based on an ignition temperature of a material. In a particular example, it may be that, to ensure the mixed material does not catch fire, the upper limit may be selected to ensure the mixed material does not exceed the ignition temperature of one or more of the thermoplastics or reinforcing materials included the granules. For example, for polyethylene (e.g., LDPE), it may be that the upper limit is selected to be less than about 260 F.

Of course, the above are merely examples of how material reaching a liquid or semi-liquid state may be detected and other techniques may be employed. Furthermore, a combination of the above-described techniques may be employed. For example, it may be the condition is detected if one or the other of the above described techniques (or other techniques) indicates the mixed material has achieved a liquid or semi-liquid state. Alternatively, it may be that both techniques (or a combination of these and/or other techniques) indicating the mixed material has achieved a liquid or semi-liquid state is required for the condition to be considered detected. In yet another example, it may be that one of resource consumption and temperature is used for the purposes of detecting the condition while the other is still monitored for other purposes. In a particular example, it may be that resource consumption (e.g. current draw) is used for detecting the condition while temperature is still monitored for the purposes of a safety threshold.

In any event, if it is determined that that condition of the thermoplastic material reaching a liquid or semi-liquid state has, directly or indirectly, been detected, an operation 508 is next. Otherwise, mixing continues at the operation 504.

At the operation 508, material is transferred from the mixer. For example, the material may be transferred by being ejected from the mixer by way of rotational action of the mixer acting on the material. For example, it may be that the material is ejected such as by centrifugal force caused by the arms 112/the drive shaft 118 of the mixer 110 as described above. Additionally or alternatively, the transfer of the material may rely on gravity acting on the material such as, for example, following opening of a gate of a mixer such as, for example, the gate 116 of the mixer 110 described above, so as to allow the mixed material to be "dumped" from the mixer. Additionally or alternatively, an auger or some other transporter (i.e., some means for conveying the mixed material) may be employed in transferring the mixed material from the mixer.

Next at an operation 510, it is determined whether the material is to be formed into a finished shape before cooling.

If it is determined that the material is to be formed into a finished shape before cooling, then an operation 512 is next. Notably in such a case, it may be that the material transferred from the mixer at the operation 508 was received into a material former such as may include, for example, a press and/or a mould.

If it is determined that the material is not to be formed into a finished shape before cooling, the process terminates following the operation 510. Notably, mixed material that is not formed into a finished shape before cooling may be later reheated so as to become malleable and then may be formed into a finished shape before the material again cools.

At the operation 512, the mixed material may be formed into a finished shape using a press and/or a mould. Forming the mixed material into a finished shape may include application of pressure such as, for example, by way of a press, so as to realize a highly integrated and structurally solid composite material. In some embodiments, the formed material may also be cut or otherwise divided into a desired shape. Notably, it may be that the material is cut prior to cooling and/or the application of pressure as it may be difficult to cut the composite material after cooling and/or compression thereof.

Conveniently, in this way a composite material may be formed. Notably, as stated above, such a material may be formed into a wide variety of shapes and finished products such as, for example, structural members and/or shipping pallets or parts thereof.

Conveniently, the composite material may be heat, fire, mold, and/or insect resistant and/or plan resistant. Heat resistance may reduce the risk and size of damage such as may result from being in the vicinity of combustible material.

Additionally or alternatively, the composite material may comply with phytosanitary standards such as, for example, the International Standards for Phytosanitary Measures No. 15 (ISPM 15).

Notably the nature of the materials used in forming a particular finished product may influence its properties. In one example, the use of nylon post-consumer/post-industrial waste material in making a particular finished product may provide chemical resistance, strength and/or superior thermal resistance. In another example, the use of fiberglass as a reinforcing material may increase strength and/or provide corrosion resistance. Additionally or alternatively, it may be durable such as, for example, in outdoor environments. Such durability may, for example, allow some such composite materials to last in the region of 100 years.

Additionally or alternatively, the composite material and, potentially, products formed of it may readily receive screws, nails and/or other fasteners. Conveniently, where such a material is used to form one or more pallet components, it may be that any nailing pattern can be used and/or nails can be received in patterns such as may be undesirable or unsuitable for use with pallet components formed of other materials such as, for example, wood.

In some embodiments, material (i.e. granules) may be added to the mixer in phases. In particular, granules of one or more thermoplastics and granules of one or more reinforcing materials may be mixed using a mixer coated with a friction coating. Then, when a suitable condition is reached such as is, for example, further described below, additional granules of one or more thermoplastics and/or one or more reinforcing materials may be added to the mixer. Notably, these may be granules of the same or of different types than the granules already added to the mixed material. The already mixed material and the additional granules may then be mixed further. For example, it may be that adding additional material to the mixer causes the liquid or semi-liquid thermoplastic to cool. In such a case, it may, for example, be that the further mixing continues until that thermoplastic again reaches a liquid or semi-liquid state. Additionally or alternatively, mixing may continue into some other thermoplastic such as, for example, newly added thermoplastic reaches a liquid or semi-liquid state. In some embodiments, this "top-up" procedure may be repeated multiple times before forming the resultant overall set of mixed material into a finished product.

In some embodiments, mix material may, at the operation 512, be formed into an intermediate rather than a finished or final form. That form may then, without allowing it to cool so much as to be no longer malleable, be further formed by one or more other means into a finished shape. For example, it may be that a first material former is used to form an intermediate shape and one or more other machines (which may also include presses and/or moulds) may be used to progressively form the material into a more refined shape. In this way, a block of moulded material may be progressively formed into a finished shape. Conveniently, it may be that such progressive forming may allow a shape to be formed having greater detail than may be possible or practicable using a single stage material forming process.

Figure 7:
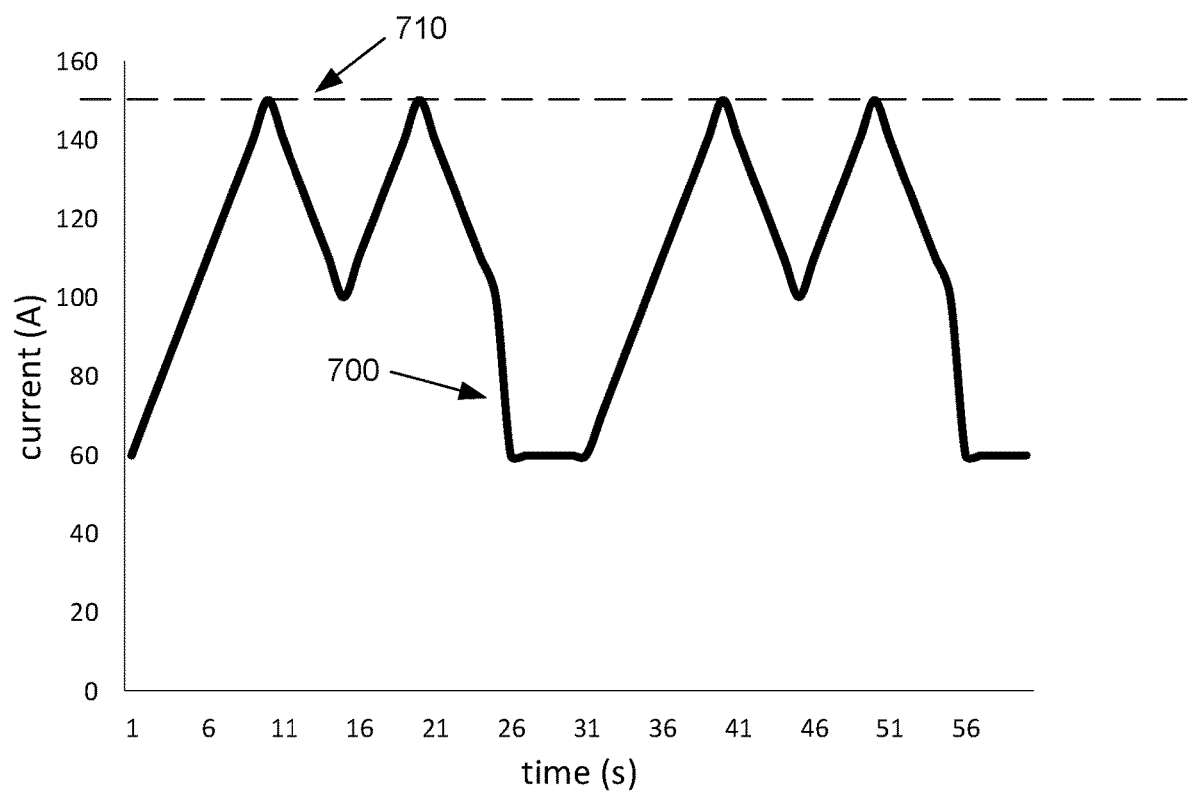
FIG. 7 is a plot showing a relationship between current and time for a motor driving a mixer for forming a composite material with additional material added during mixing.

FIG. 7 is a plot showing a relationship between current and time for a motor driving a mixer for forming a composite material with additional material added during mixing in accordance with the foregoing. For example, FIG. 7 may correspond to current draw by motor 132 when employed as part of the mixer drive system 130 when the motor 132 is an electric motor and the example system 100 is being operated in a manner that includes such a "top-up" procedure.

As illustrated, during mixing, a current draw 700 may increase until reaching a threshold level 710 at a time ti. The current draw 700 reaching at or about the threshold level 710 may indicate that the mixer is sufficiently full of material to be mixed. In other words, the threshold level 710 may correspond to a nominal maximum current to which the motor should be subject during mixing—i.e., to avoid undue loading of the motor. As mixing continues, the current drawn by the motor may, as shown, decrease as the one or more thermoplastics in the material being mixed approach and eventually achieve a liquid or semi-liquid state.

Additional material may then be added to the mixer as described above. In particular, granules of one or more thermoplastics and/or one or more reinforcing materials may be added.

Such a cycle may then continue, with additional material being introduced when possible to do so without unduly burdening the motor.

Figure 8:
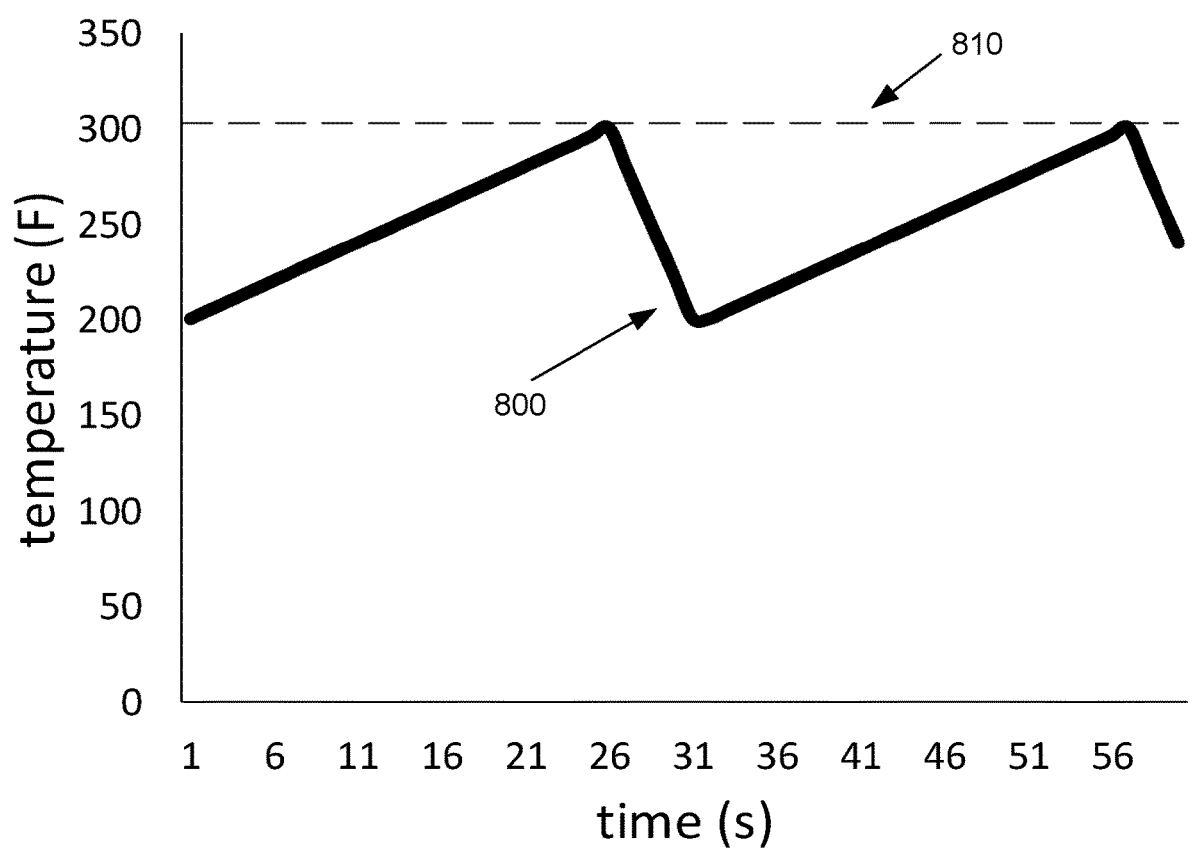
FIG. 8 is a plot showing a relationship between temperature and time for the interior of a mixer during forming a composite material with additional material added during mixing.

FIG. 8 is a plot showing a relationship between temperature and time for an interior temperature of a mixer for forming a composite material with additional material added during mixing in accordance with the foregoing.

As illustrated, material (e.g. thermoplastic(s) and reinforcing material(s)) is added to the mixer and, progressively, a temperature 800 inside the mixer may increase during mixing as the added material is heated such as due to interaction with the friction coating. The temperature may begin to climb until reaching a threshold level 810 as may indicate that one of the one or more thermoplastics in the mixer has reached a liquid or semi-liquid state.

Once the threshold level 810 is reached, the mixed material may be unloaded from the mixer in manners described above. New material may then be added to the mixer for mixing in a next batch. Mixing of the next batch may begin at a time t4. The next batch may be processed in a similar manner to the above-described batch.

As noted above, granules of one or more thermoplastics and granules of one or more reinforcing materials are loaded into the mixer. As such, the method of forming a composite material described above in relation to FIG. 5 may also be considered to include preparation of such granules. The granules and possible methods of preparation thereof will now be described.

The granules of one or more thermoplastics may, broadly put, be formed of any type of thermoplastic. For example, the granules of one or more thermoplastics may be formed of one or more polyethylene terephthalate (PETE/PET), high-density polyethylene (HDPE/PE-HD), polyvinyl chloride (PVC), polycarbonate (PC), low-density polyethylene (LDPE/PE-LD), polypropylene (PP), nylon, polystyrene (PS), polyester, acrylonitrile butadiene styrene (ABS), polylactic acid (PLA) and/or other thermoplastics and/or combinations of the foregoing. As such, the various thermoplastics listed in the table 600 may be variously employed. Notably, granules may be formed of mixed thermoplastics. The granules may be prepared from post-consumer and/or post-industrial plastics. Conveniently, because mixed post-consumer/post-industrial plastics may be employed, materials may be employed as may be unsorted or may be poorly sorted such as, for example, products as may be collected by some municipal recycling programs. Additionally or alternatively, it may be that such materials include some degree of contamination as further described below. In summary, material used in preparing granules may, in some embodiments, include one or more of recovered, reclaimed, recycled, land-fill diverted, waste-stream diverted, mixed recycling, co-mingled, difficult-to-recycle, contaminated, salvaged, un-useable, un-wanted, un-marketable, and/or defective materials. Material used in preparing granules may, additionally or alternatively, include construction, demolition and/or renovation waste.

Thermoplastics may be granulated to form granules of thermoplastic(s) having particles of no more than a particular size. Grinding thermoplastics to have particles of at most a particular size may ensure or urge appropriate melt-viscosity properties. Appropriate melt-viscosity properties may allow a particular thermoplastic to act as a binder in a composite material according to the present application and/or may improve its function when acting as a binding.

Thermoplastics may be granulated to have a particle size of between 1 and 50 mm. The maximum size selected for the granules may be a function of the particular thermoplastic(s) being employed. Additionally or alternatively, the maximum size selected for the granules may be a function of the intended use of the end product (i.e., into which the material will be incorporated).

It may be that one or more of the thermoplastics are washed prior to or following granulation. Thermoplastic that is washed may be dried. For example, washed thermoplastic may be dried to have a moisture level of less than 2%. Drying to a moisture level of less than 2% may avoid the introduction of unnecessary water into the process. Unnecessary water may hinder the process or may increase the energy input required to form the composite material.

Thermoplastics may be granulated by grinding and/or cutting to produce particles of the desired size.

As mentioned above, the granules of the one or more reinforcing materials may be formed from a variety of reinforcing materials including, for example, wood/wood products, carpets, textiles fibreglass, thermoset material, and/or combinations thereof. In another example, the reinforcing materials employed may, additionally or alternatively, include other materials such as, for example, forestry waste and/or agricultural waste. For example, sawdust, flax, straw, and/or hemp may be employed as reinforcing materials. Additionally or alternatively, other reinforcing materials amenable to binding with a selected thermoplastic may be employed.

Considerations related to reinforcing materials will now be discussed.

Reinforcing materials may be granulated to produce the granules. Reinforcing materials may be granulated to have a particle size of 1 and 50 mm.

As noted above, the reinforcing materials may include wood. For example, post-consumer/post-industrial wood may be employed such as, for example, construction, demolition and/or renovation waste wood. Wood used as reinforcing material may include softwood lumber (e.g., spruce, pine, fir) and may also include wood products such as, for example, plywood, oriented strand board (OSB), particle board, medium density fibreboard (MDF), and the like. Wood may be granulated in a multi-stage process. For example, the wood may be chipped and then the chips may be granulated. In a particular example, the wood may be chipped into pieces having a particle size between 1 and 50 mm. The resultant chips may then be granulated into smaller pieces. For example, the wood particles may be between 1 and 25 mm in size. Additionally or alternatively, some or all of the wood particles could, once processed, be as fine as sawdust.

The reinforcing materials may be dried prior to or following granulation. Wood, for example, may be dried to have a moisture level of less than 10%. A moisture level of less than 10% may achieve a balance between excessive effort to dry the wood while avoiding the introduction of unnecessary water into the process. As noted above, unnecessary water may hinder the process or may increase the energy input required to form the composite material.

In another example, the reinforcing materials employed may, additionally or alternatively, include textiles including, for example, clothing or fabrics. Such clothing or fabrics may, for example, be formed of polyester or polycotton blends. Notably, some textiles may also provide a thermoplastic component as well as a fibre component such as, for example, articles formed of polycotton blends. The fibrous granules may be prepared from post-consumer and/or post-industrial reinforcing materials. Where textiles are employed, used or otherwise unwanted or surplus textile articles may be shredded. For example, T-shirts such as, for example, used T-shirts, may be shredded so as to provide granules of reinforcing materials.

In another example, the reinforcing materials employed may, additionally or alternatively, include paper, paper products, and/or articles formed from paper. In some embodiments, such paper-based items may be post-consumer and/or post-industrial waste. Paper-based items may include, for example, paper cups or coated paper (both which may also provide thermoplastic such as, for example, due to a plastic film coating), gift wrap (which could include other materials such as plastics, foil, etc.), and/or various difficult to recycle papers.

In another example, thermoset materials may be employed. Thermoset refers to a class of plastics or polymers that once formed cannot be melted or remoulded. At sufficient temperature, such thermoset materials will combust rather than melt. Thermoset materials may include, for example, melamine formaldehyde, epoxy resin, polyester rein, urea formaldehyde or the like.

One or more of the reinforcing materials and/or one or more of the thermoplastics employed may be post-consumer and/or post-industrial waste material. Conveniently, recycling of such materials according to the subject matter of the present application may have the effect of reducing landfill waste, sequestering carbon, reducing methane gas and/or reducing deforestation. For example, pollution or green house gas emissions may be reduced due to a consequent reduction in need to transport or incinerate waste material. Additionally or alternatively, where post-consumer and/or post-industrial waste material can be employed, the use of virgin materials to produce products that can be substituted by products produced in accordance with the subject-matter of the present application may be avoided, potentially thereby reducing landfill waste, sequestering carbon, reducing methane gas and/or reducing deforestation.

A mix of thermoplastics may be employed in forming the thermoplastic granules. Accordingly, thermoplastics may be employed in forming a composite material according to the subject matter of the present application even if they are cross-contaminated with plastics of other types. For example, poorly sorted or unsorted post-consumer/post-industrial plastics may be utilized. Additionally or alternatively, thermoplastic articles composed of multiple different types of plastic (e.g., co-mingled plastics) may be employed.

As mentioned above, it may be that contaminated material is employed. Contaminated material may, for example, refer to any material unintentionally or incidentally introduced to the composite material or manufacturing process that possesses a low surface energy and high contact angle, and may include but is not limited to organic, metallic, mineral, or toxic material. For example, it may be that, plastics and/or reinforcing materials contaminated with other materials may be employed. In a particular example, post-consumer/post-industrial waste material may have levels of contamination and/or may be of material types not amenable to traditional recycling processes. For example, post-consumer/post-industrial plastics may be soiled or may include other materials such as, for example, paper labels, etc. Conveniently, some contamination of thermoplastic materials may serve as reinforcing material (e.g., if the contamination is paper). In another example, used plastic containers may be contaminated with materials they were used for storing such as, for example, food wastes on food containers. Such containers may nonetheless be decomposed to form thermoplastic granules according to the present application. Where washing is employed in forming the granules some or all of such contamination may be removed thereby. Additionally or alternatively, such contaminates may be destroyed or decomposed by way of heating action during the mixing. In another example, painted wood may be employed in forming fibrous granules. In yet another example, thermoplastics and/or reinforcing materials contaminated with materials other than reinforcing materials and/or thermoplastics may be employed. For example, aluminum trays lined with thermoplastic might be included in material used to form the thermoplastic granules. Provided that sufficient thermoplastic is nonetheless provided in the mix of granules as will act a binder for any resultant composite material formed according to the subject matter of the present application, such contaminated materials may not prevent creation of a composite material. Indeed, any contaminates that survive the mixing process may, effectively, act as a further reinforcing agent in any resultant composite material.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

As noted, certain adaptations and modifications of the described embodiments can be made. Therefore, the above-discussed embodiments are considered to be illustrative and not restrictive.

What is claimed is:

1. A method of forming a composite material comprising:
mixing material including granules of one or more thermoplastics and granules of one or more reinforcing materials using a mixer having interior surfaces coated with a friction coating, wherein the friction generated by interaction between the granules and friction coating causes granules of at least one of the one or more thermoplastics to be heated to a liquid or semi-liquid state, the liquid or semi-liquid thermoplastic acting as binder for the mixed material.

2. The method of claim 1 further comprising:
forming the mixed material into a shape.

3. The method of claim 2 further comprising:
forming the shape into a finished shape.

4. The method of claim 2 wherein, before forming the mixed material into the shape, the mixed material is allowed to cool and is then heated at least until the mixed material becomes malleable.

5. The method of claim 1 wherein at least one of the one or more thermoplastics and the one or more reinforcing materials is a post-consumer or a post industrial waste material.

6. The method of claim 1 wherein the friction coating is a tungsten carbide grit.

7. The method of claim 6 wherein the tungsten carbide grit consists of particles of sizes corresponding to an ISO 6344 grit between P20 and P50.

8. The method of claim 1 wherein the one or more thermoplastics include at least one of polyethylene terephthalate, polyethylene, polyvinyl chloride, polycarbonate, polypropylene, nylon, polystyrene, polyester, acrylonitrile butadiene styrene, and polylactic acid.

9. The method of claim 1 further comprising:
granulating the one or more thermoplastics to form the granules of one or more thermoplastics.

10. The method of claim 9 further comprising:
prior to granulating the one or more thermoplastics, washing and drying the one or more thermoplastics.

11. The method of claim 1 wherein the one or more reinforcing materials include at least one of wood, wood products, textiles, agricultural fibres, plant fibres, organic fibres, carpet, upholstery, spun fibre, and thermoset material.

12. The method of claim 1 further comprising:
granulating the one or more reinforcing materials to form the granules of one or more reinforcing materials.

13. The method of claim 12 wherein the one or more reinforcing materials include wood and wherein, prior to granulation, the wood is chipped into pieces.

14. The method of claim 1 further comprising detecting that the granules of the at least one of the one or more thermoplastics have been heated to the liquid or semi liquid state based on a measured temperature inside the mixer.

15. The method of claim 2 wherein the mixed material is formed into a shape using a press.

16. The method of claim 1 further comprising:
adding at least one of additional granules of one or more thermoplastics and additional granules of one or more reinforcing materials to the mixer; and
further mixing the mixed material and the additional granules.

* * * * *